R. N. ROSS. 3 Sheets—Sheet 1.

Assignor, by direct and mesne assignments, to the EUREKA BRICK MACHINE MANUFACTURING COMPANY.

BRICK MACHINE.

Reissued Sept. 23, 1884.

No. 10,524.

WITNESSES

P. W. Hale

Harry G. Davis

INVENTOR

Robert N. Ross, by W. B. Hale

Attorney

N. PETERS, Photo-Lithographer, Washington, D. C.

R. N. ROSS.

Assignor, by direct and mesne assignments, to the EUREKA BRICK MACHINE MANUFACTURING COMPANY.

BRICK MACHINE

No. 10,524. Reissued Sept. 23, 1884.

WITNESSES

P. W. Hale

Harry V. Davis

INVENTOR

Robert N. Ross, by W. B. Hale,

Attorney

N. PETERS, Photo-Lithographer, Washington, D. C.

R. N. ROSS. 3 Sheets—Sheet 3.
Assignor, by direct and mesne assignments, to the EUREKA BRICK MACHINE MANUFACTURING COMPANY.
BRICK MACHINE.
No. 10,524. Reissued Sept. 23, 1884.
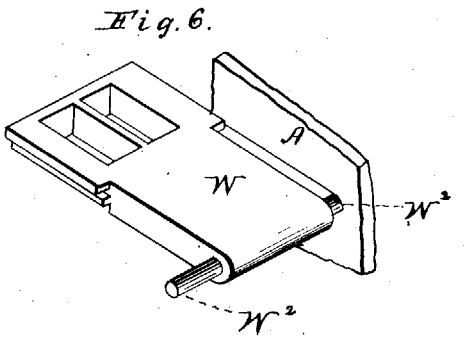
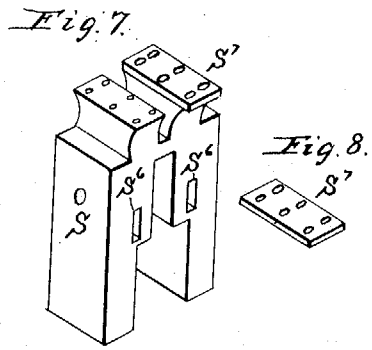
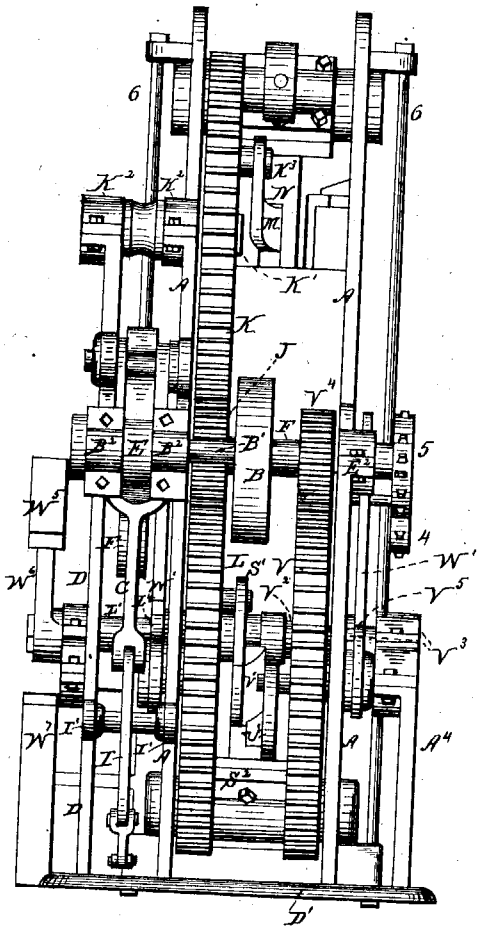
WITNESSES
P. W. Hale
Harry Y. Davis.
INVENTOR
Robert N. Ross.
by W. B. Hale,
Attorney
N. PETERS. Photo-Lithographer, Washington, D. C.

UNITED STATES PATENT OFFICE.

ROBERT N. ROSS, OF ST. LOUIS, MISSOURI, ASSIGNOR, BY DIRECT AND MESNE ASSIGNMENTS, TO THE EUREKA BRICK MACHINE MANUFACTURING COMPANY, OF LOUISVILLE, KENTUCKY.

BRICK-MACHINE.

SPECIFICATION forming part of Reissued Letters Patent No. 10,524, dated September 23, 1884.

Original No. 293,596, dated February 12, 1884. Application for reissue filed May 21, 1884.

*To all whom it may concern:*

Be it known that I, ROBERT N. ROSS, a citizen of the United States, residing at St. Louis, in the county of St. Louis and State of Missouri, have invented certain new and useful Improvements in Brick-Machines, of which the following is a specification, reference being had therein to the accompanying drawings, in which—

Figure 2:
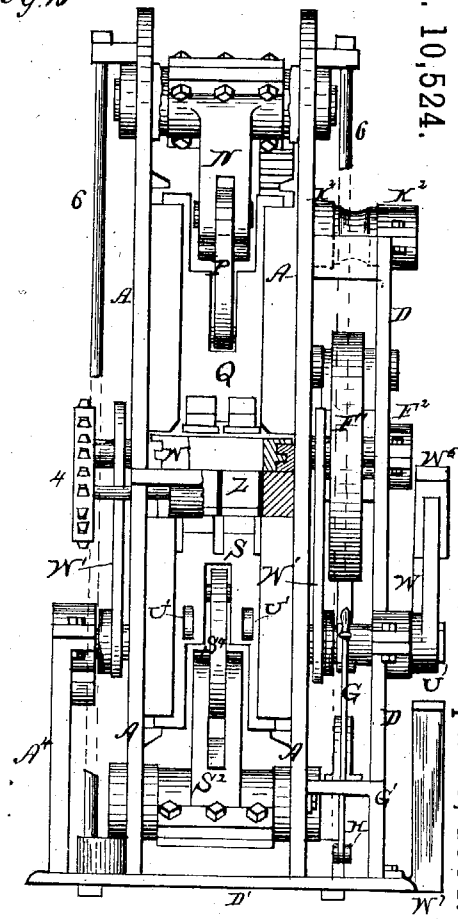
Figure 1:
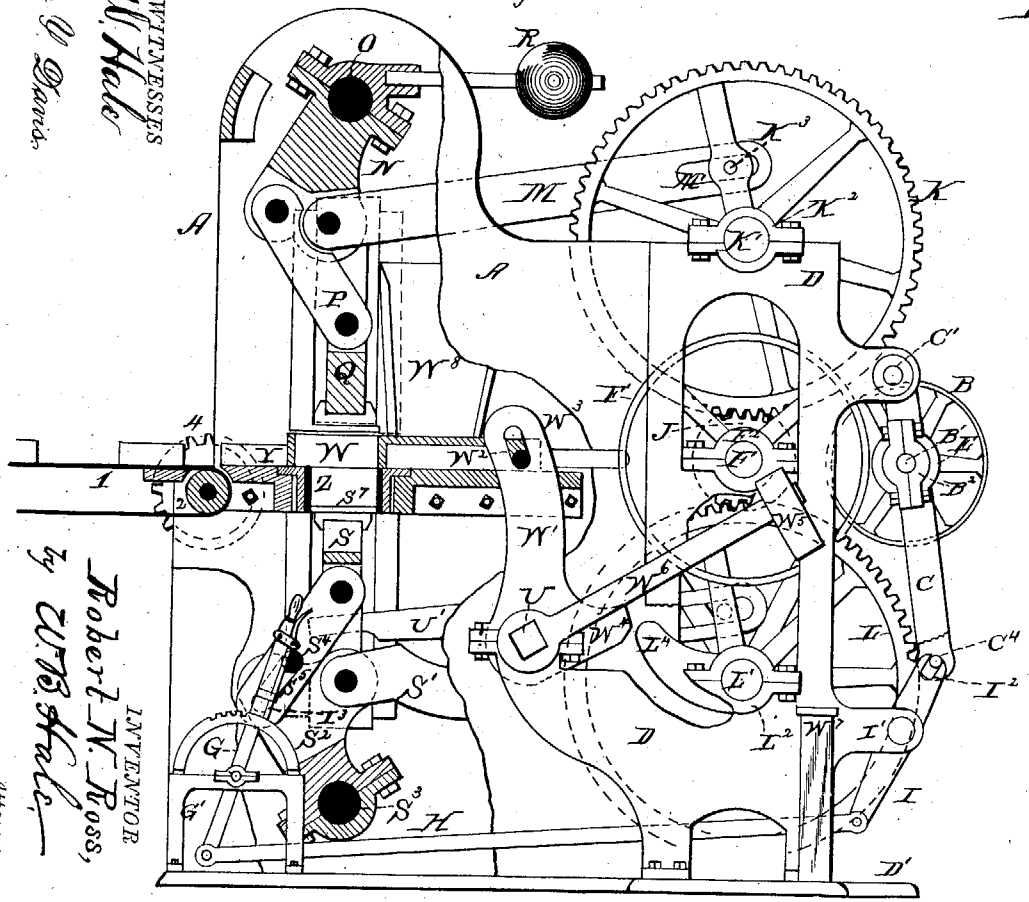
Figure 3:
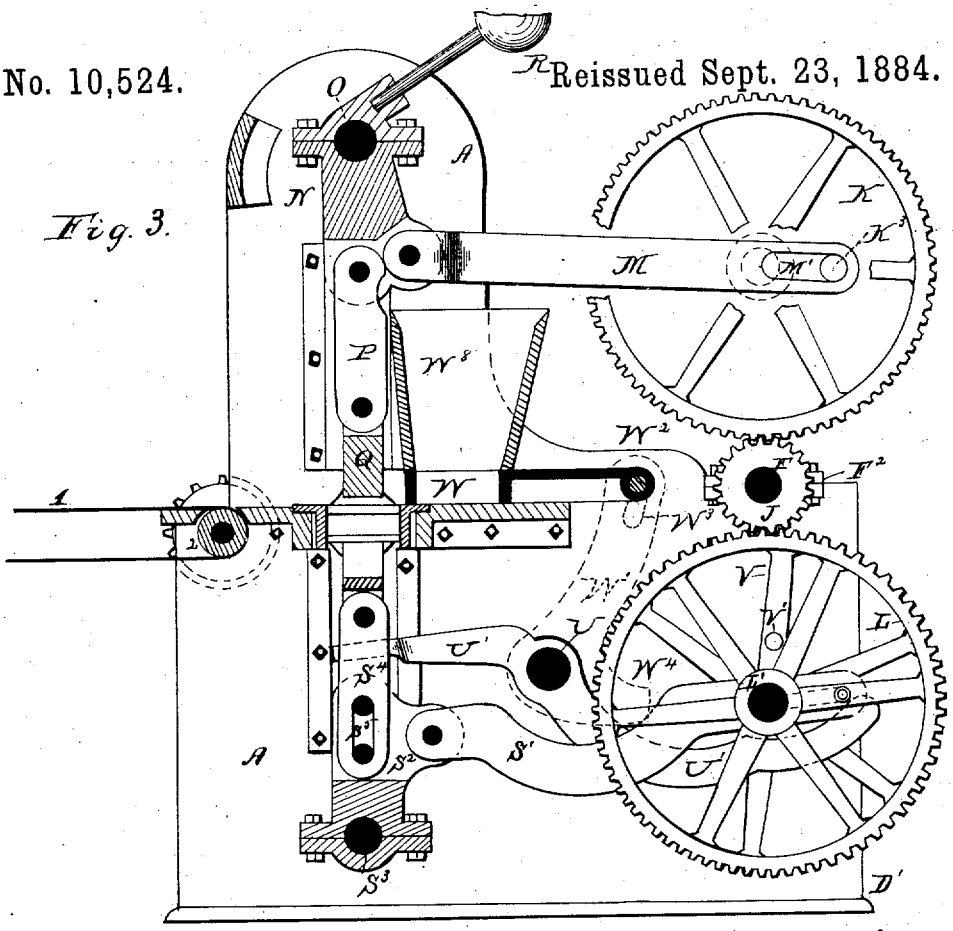
Figure 4:
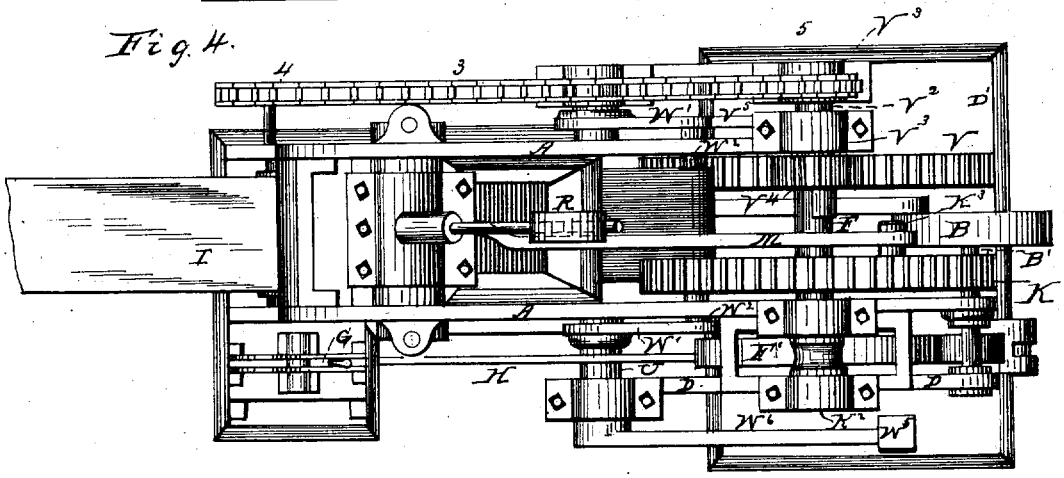

Figure 1 is part in side elevation and part in vertical section. Fig. 2 is a front end view. Fig. 3 is a vertical section showing the parts in a different position from that shown in Fig. 1. Fig. 4 is a top view. Fig. 5 is a rear end view. Fig. 6 is a perspective view of the charger. Fig. 7 is a perspective view of the lower plunger, and Fig. 8 is a similar view of one of the removable plates which form the faces of the dies of the lower plunger.

My invention relates to that class of brick-machines wherein opposing plungers approaching each other press the clay in the molds; and my invention consists in points of novelty hereinafter fully described and claimed.

Referring to the drawings, A represents the outer casing or housing of the machine, and B the driving-pulley, rigidly secured to the shaft B′, journaled in boxes $B^2$, secured to a swinging frame, C, supported on a bolt or rod, C′, having bearing at one end in one side of the housing A, and at the other end in a side plate, D, supported by the base D′ of the machine.

On the shaft B′, between the boxes $B^2$, and rigidly secured thereto, is a friction driving-roller, E, (see Fig. 1,) which bears against and turns a roller or wheel, F′, on a counter-shaft, F, journaled in suitable boxes, $F^2$, secured to the side plate, D, and to the housing A. (See Figs. 1, 2, 4, and 5.) The friction-roller E can be thrown out of or in contact with the roller F′ by means of a lever, G, fulcrumed in a frame, G′, (see Fig. 1,) and connected at its lower end by means of a rod, H, with the lower end of an arm, I, pivoted to lugs I′ of the housing, and connected by its other end to the lower end of the swinging frame C, the connection being made by means of a pin, $C^4$, in the frame entering slots $I^2$ of the arm. Thus it will be seen that by operating the lever the friction-wheels can be brought into and thrown out of engagement. The lever is held to its adjustment by a catch-bar, $I^3$, engaging with the frame by means of notches, as shown in Fig. 1.

On the shaft F, and rigidly secured thereto, is a pinion, J, which meshes into two cog-wheels, K L, the former being on a shaft, K′, working in journal-boxes $K^2$, (see Fig. 5,) and the latter being on a shaft, L′, journaled in boxes $L^2$. (See Figs. 1 and 5.)

Connected to one of the spokes or arms of the wheel K is an arm, M, the connection being made by a pin, $K^3$, in the spoke entering a slot, M′, in the end of the arm. (See Figs. 1 and 3.) The other end of the arm M is connected to a block, N, rocking on a shaft, O, supported by the housing A. (See Figs. 1, 2, and 3.) The rock-block N is also connected to the upper plunger, Q, by a link, P, (see Figs. 2 and 3,) and thus it will be seen that as the wheel K is turned this plunger will be first raised, as shown in Fig. 1, and then compressed, as shown in Fig. 3, and as the pin $K^3$ works in a slot of the arm, there will be a lost motion at each revolution of the wheel, allowing the plunger to remain at rest at short intervals each time it is raised, allowing time for the bricks to be removed and the molds refilled, as hereinafter described. R represents a counterbalance-weight for sustaining the plunger during these intervals. (See Figs. 1 and 3.)

In the same manner that the wheel K is connected to the upper plunger is the wheel L connected to the lower plunger, S, the connecting-arm being lettered S′, the rocking block $S^2$, its supporting-shaft $S^3$, and the link connecting the block with the plunger $S^4$, through which the connecting-bolt passes, the object being to allow the plunger to be raised after the rocking block has done its work by means of a lever-arm, U′, fulcrumed on a shaft, U, supported by the housing of the machine and a side plate, $A^4$. (See Figs. 2, 4, and 5.) The forward end of the arm U′ engages with the plunger. The other end is operated on by a pin, V′, of a wheel, V, on the shaft $V^2$, journaled in boxes $V^3$, secured to the housing. The wheel V is engaged and driven by a pinion, $V^4$, on the counter-shaft F. (See Figs. 4 and 5.) Thus, when the block $S^2$ has raised the plunger, as shown in Fig. 3, completing its work, the arm U′ is operated, as described, carrying the lower plunger up as the upper plunger makes its upward movement, the bricks of course being carried up between them, the lower plunger rising to the top of the mold, and thus neither plunger is pulled away from the brick while in the mold, so as to cause a strong suction, which is liable to injure the brick. This I consider a matter of great practical importance, not only from the fact that a separation of the upper plunger from the brick would exert upon it a suction tending to impair its integrity, but also because the strong vacuum created behind the plunger would require a great waste of power to overcome it. When the lower plunger has been raised to the necessary height to carry the brick clear of the mold, the pin V′ of the wheel V passes onto a portion of the lever U′, so curved as to allow said lower plunger to remain temporarily stationary, while the upper plunger continues its ascent slightly in order to separate from the brick. While the two plungers are thus temporarily sustained the charger W makes a forward movement, (see Figs. 1 and 3,) shoving the bricks that have just been raised from the molds onto a rest, Y. At this moment the pin V′ of the wheel V slips off the lever U′, and consequently the lower plunger drops, and the charge of clay in the charger drops into the molds, after which the charger makes a quick backward movement to get out of the way of the upper plunger as it makes its descent. The charger is forced forward by arms W′, to which it is connected by a pin, $W^2$, working in slots $W^3$ of the arms. The arms are rigidly secured to the rock-shaft U, (upon which the lever U′ is loosely fulcrumed,) and have rearwardly-extended ends $W^4$, which are operated on by cams $L^4$ and $V^5$ striking them from beneath, these cams being secured, respectively, to the shafts L′ and $V^2$. When the charger has thus been forced forward and charges the molds, it receives a quick backward movement (as soon as the cams leave the arms) by an adjustable counter-balance, $W^5$, on an arm or lever, $W^6$, rigidly secured to the shaft U. (See Figs. 1, 2, 4, and 5.)

$W^7$ (see Fig. 2) is a cushioned post to receive the counter-balance and stop its descent, when the charger has been moved back, until its receptacles are under the hopper $W^8$, which holds the clay for filling the charger. (See Fig. 3.) When the charger again moves forward to remove bricks from the lower plunger, it forces them against those previously deposited on the rest, driving them onto an endless belt, 1, which carries them away, and so on. The belt is driven by a shaft, 2, journaled in the frame and turned by a chain, 3, connecting it with the shaft F by suitable sprocket-wheels, 4 5. (See Figs. 4 and 5.)

My machine is designed to make two bricks at a time, so there is a pair of molds, and each plunger has a pair of dies, (see Fig. 7,) and the charger a pair of receiving-receptacles. (See Fig. 6.) The holes $S^6$ in the lower plunger (see Fig. 7) are to receive the forked end of the lever U′.

In order to make different thicknesses of brick and have a uniform pressure on all, I provide the lower plunger-dies with removable plates $S^7$ (see Figs. 7 and 8) of different thicknesses.

6 represents strengthening rods or ties connecting the upper part of the machine with the base. (See Figs. 2 and 5.)

I claim as my invention—

1. In a brick-machine, the stationary molds Z, in combination with plungers Q and S, connected to blocks N and $S^2$ by links P and $S^4$ and coupling-links or arms M and S′, and drive-wheels K and L, to which the arms are connected, and suitable means for turning the wheels, substantially as shown and described.

2. In a brick-machine, the charger W, operated in one direction by arms W′, pivoted to the shaft U, and cams $L^4$ $V^5$ on the shafts L′ $V^2$, and in the other direction by a counterbalance, $W^5$, substantially as shown and described, for the purpose set forth.

3. In a brick-machine, the combination of driving-pulley B and friction-roller E, secured to the swinging frame C, and the friction-roller brought and held in contact with the driving-roller F′ by pivoted arm I, rod H, lever G, and frame G′, all substantially as shown and described, for the purpose set forth.

4. In a brick-machine, the combination, with a mold, mold-charger, and automatic mechanism for moving said charger forward over the mold and then releasing it, of a counterbalance-weight arranged to give the charger a quick backward movement, substantially as described.

5. The combination, with the mold and upper plunger arranged to work therein and to be withdrawn above the same, the mold-charger and automatic mechanism for moving said charger forward over the mold and under the retracted plunger and then releasing it, of a counterbalance-weight arranged to give the charger a quick backward movement to remove it from the path of the said plunger, substantially as described.

6. In a brick-machine, the combination, with the lower compression-plunger, the mechanism for giving it its upward compressing movement, and the slotted link connecting it with said mechanism by slot and pin engagement, of the pivoted lever U′, having one end arranged to force the plunger upward, and devices for acting on the other end of said lever to cause it to raise the plunger a farther distance to eject the brick after the compression of the clay has been accomplished.

7. In a brick-machine of the character described, the combination, with the lower compression-plunger and mechanism for forcing it up to compress the clay, of the lever U′, operated by pin V′ on wheel V, for farther raising the lower plunger to eject the brick from the mold, and for holding said plunger momentarily stationary in its elevated position by means of the said pin and a properly-curved end portion of the lever while the brick is being removed from the plunger, essentially as set forth.

In testimony whereof I affix my signature in presence of two witnesses.

ROBT. N. ROSS.

Attest:

HENRY H. KELLER,
NOBLE CLARKE.